United States Patent [19]
McGinty

[11] 3,939,761
[45] Feb. 24, 1976

[54] BARBECUE ROTISSERIE APPARATUS

[76] Inventor: Clarence E. McGinty, 6226 Marjorie Lane, Wichita, Kans.

[22] Filed: May 1, 1972

[21] Appl. No.: 249,677

[52] U.S. Cl. ............................................. 99/421 H
[51] Int. Cl.[2] ........................................ A47J 37/04
[58] Field of Search ........ 99/419, 420, 421; 30/322, 30/323; 126/9, 11, 25; 279/9, 102, 103

[56] References Cited
UNITED STATES PATENTS

| | | | |
|---|---|---|---|
| 1,638,452 | 8/1927 | Panajiotaros et al. | 99/420 UX |
| 2,581,570 | 1/1952 | Amanatides | 99/421 V |
| 2,720,699 | 10/1955 | Boruvka | 30/322 |
| 2,815,706 | 12/1957 | Weinberger | 99/419 |
| 2,910,930 | 11/1959 | Hankoff | 99/421 HH |
| 2,939,384 | 6/1960 | Vinson | 99/421 HH |
| 3,028,801 | 4/1962 | Watts | 99/419 |
| 3,169,470 | 2/1965 | Oatley | 99/421 HH |
| 3,335,712 | 8/1967 | Marasco | 99/421 H X |
| 3,338,156 | 8/1967 | Angelos | 99/420 X |

*Primary Examiner*—Stanley N. Gilreath
*Assistant Examiner*—Arthur O. Henderson
*Attorney, Agent, or Firm*—Edward L. Brown, Jr.

[57] ABSTRACT

A barbecue rotisserie skewer having at least two closely spaced tines rigidly supported at one end by handle structure and the other end by a support receptacle which not only supports the skewer for rotation but rigidly holds the free ends of the tines. The support receptacle easily slides off the tines for receipt and removal of the food being cooked.

2 Claims, 11 Drawing Figures

FIG. 1
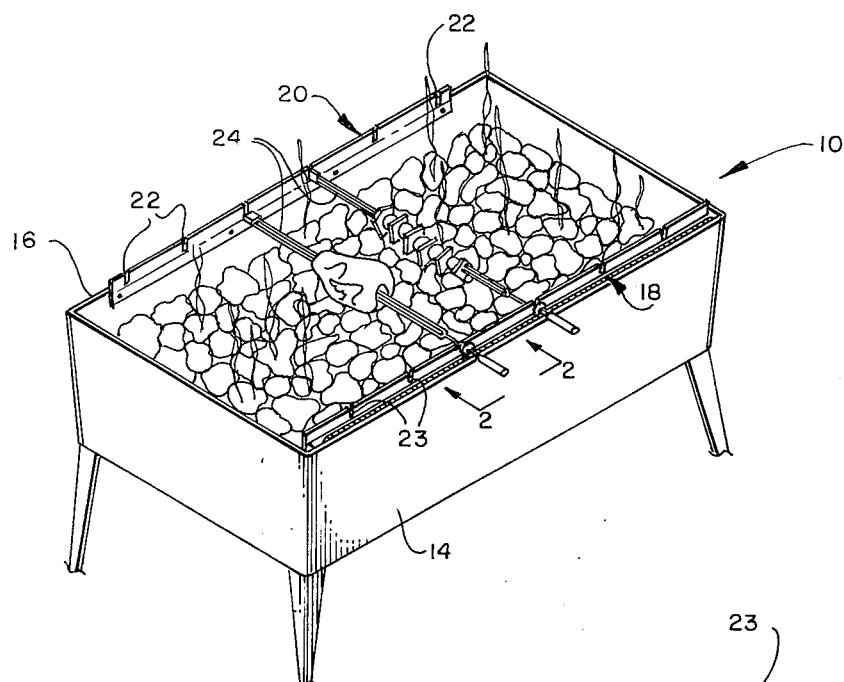
FIG. 3
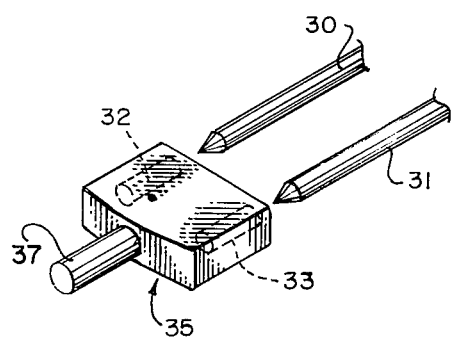
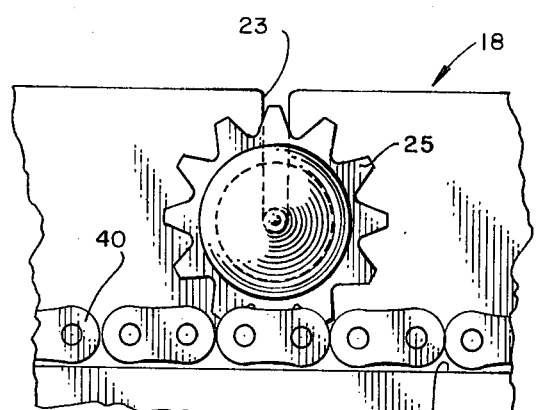
FIG. 2
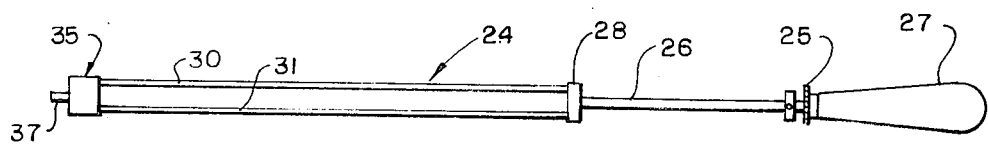
FIG. 4
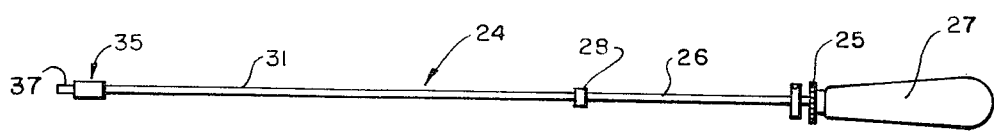
FIG. 5.

U.S. Patent Feb. 24, 1976 Sheet 2 of 2 3,939,761
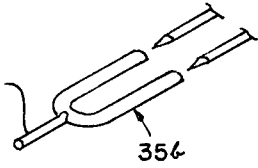
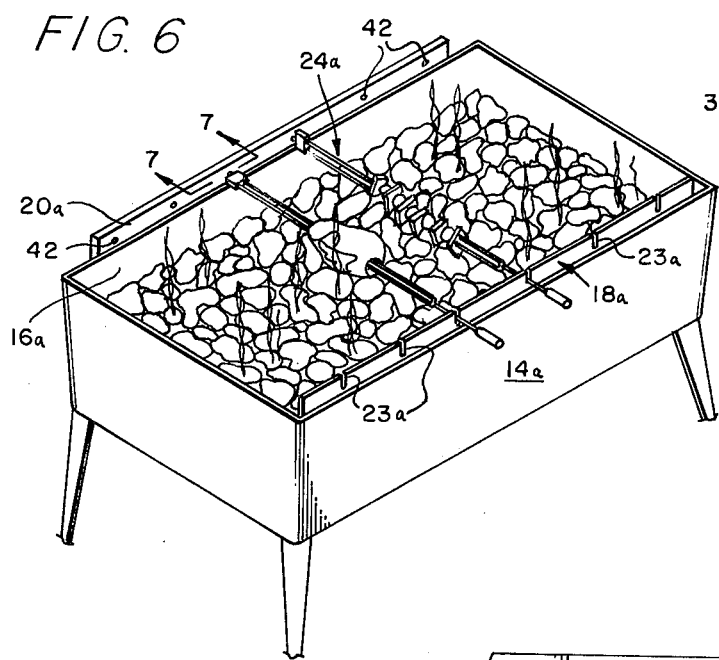
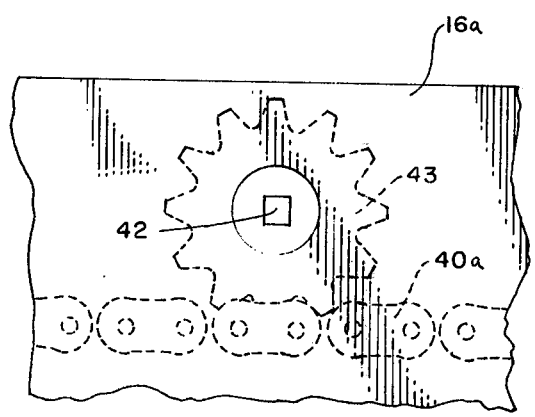
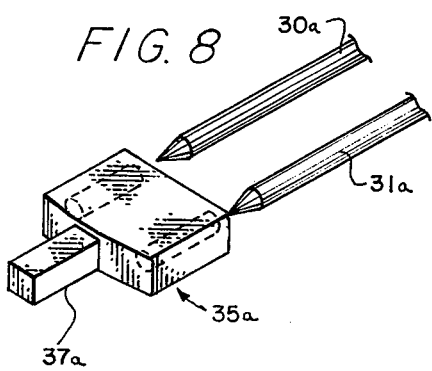
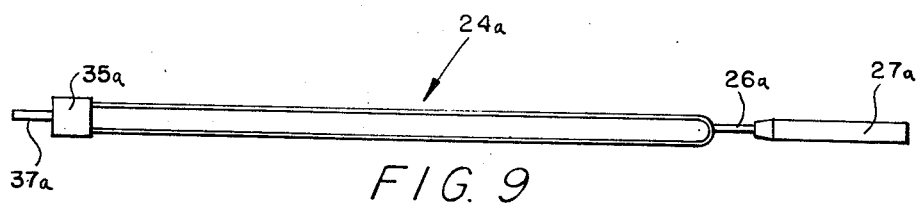
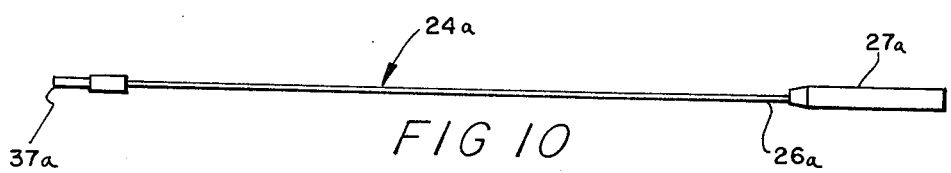

BARBECUE ROTISSERIE APPARATUS

BACKGROUND OF THE INVENTION

Most rotisserie skewers presently being made utilize a single shaft or rod which provides a relatively weak support for some foods in their soft condition. Quite often, what happens is that the food stops rotating while the shaft continues to move. Various types of basket arrangements have been utilized to confine the food but have not been entirely satisfactory. Another remedy has been the utilization of a multiple-pronged bracket which itself fastens on the main skewer shaft while its outwardly spaced prongs are brought into engagement with the food so as to prevent food from rotating on the main shaft. Holding brackets of this nature have a limited value in that they do not pass through the food the full length of the skewer.

SUMMARY OF THE INVENTION

With the present invention, the problem of rotation of the food on the skewer is remedied by the usage of two or more skewer shafts which pass completely through the food. With the usage of two closely spaced skewer shafts, a much smaller diameter shaft can be used since the bending strength of multiple spaced apart shafts is greater than a single shaft. Smaller diameter shafts are also advantageous in that the initial skewing or impaling of the food is made easier and also delicate foods can be more easily handled.

Therefore the principal object of the present invention is to provide a rotisserie skewer which provides better holding properties for the food carried thereon.

Another object of the present invention is to provide a rotisserie skewer which permits easy receipt and removal of food therefrom with minimal damage to the food.

A further object of the present invention is to provide a much simplified drive means for rotating a plurality of rotisserie skewers at the same time.

The above mentioned objects and advantages of this invention together with the manner of obtaining them will become more apparent and the invention itself will be best understood by making reference to the following description of an exemplary embodiment of the invention taken in conjunction with the accompanying drawings wherein:

FIG. 1 shows a perspective view of a barbecue type cooking bed with the skewers and rotisserie apparatus of the present invention mounted on the sides thereof;

FIG. 2 is an enlarged broken-out elevational view taken along lines 2 — 2 of FIG. 1;

FIG. 3 is an enlarged perspective view of the skewer support receptacle positioned for engagement with the tines of the skewer;

FIG. 4 is a top elevational view of the complete skewing rod assembly;

FIG. 5 is a side elevational view of a complete skewing rod assembly;

FIG. 6 is a perspective view of a modified form of skewing rod and rotisserie mechanism;

FIG. 7 is an enlarged broken-out elevational view taken along lines 7 — 7 of FIG. 6;

FIG. 8 is a perspective view of a modified form of support receptacle and its companion tines;

FIG. 9 is a top plan view of complete modified form of skewer rod assembly;

FIG. 10 is a side elevational view of a complete skewer rod assembly in its modified form; and FIG. 11 is a perspective view of a further modified form of support receptacle.

Referring now to the drawings and more specifically to FIG. 1, reference numeral 10 generally identifies a barbecue rotisserie which incorporates the present invention. Any type of rectangular shaped barbecue could be utilized as long as it had parallel side walls such as those shown by numerals 14 and 16 which provide a mounting base for the frame rotisserie members 18 and 20. Frame member 20 is provided with a plurality of evenly spaced vertical slots 22 which provide a rotating journal for the ends of the rotisserie skewer assemblies 24. The companion frame member 18 mounted on the opposite wall 14 of the barbecuer 10 provides not only a journal and slots 23, but also a drive means as hereinafter described in detail.

The skewer rod assembly 24, as shown in detail in FIG. 4, includes a center rod portion 26 with an insulated handle 27 located at its outer end. At juncture member 28, the center rod divides into a pair of parallel spaced tine members 30 and 31 upon which the food is skewed. The pointed outer ends of the tines 30 and 31 are received in openings 32 and 33 closed at one end in the support receptacle 35. Extending outwardly from the support receptacle 35 is a lug or shaft 37 which rests in slot 22 in the rotisserie frame member 20. Rigidly mounted on the center rod 26 adjacent the handle 27 is a sprocket gear 25 which transmits the rotative force to the skewer rod assembly 24.

The rotisserie frame member 18 carries an endless drive chain 40, as viewed in FIGS. 1 and 2. Drive chain 40 is supported at each end by a sprocket member which is not shown in the drawing. Any type of drive motor can be attached to either one of the last mentioned sprockets or to an additional drive sprocket which comes in contact with the chain 40. The chain is maintained in position by the planar surface 41 of the frame member 18 as it travels thereacross spaced below the individual grooves 23 a distance equivalent to the radius of sprocket gear 25.

FIGS. 6 through 10 illustrate a modified form of the barbecue rotisserie whereby the skewers 24a are driven off the support receptacle 35a rather than the sprocket gear as shown in the previous figure. The skewer rod assembly 24a has a shortened center rod 26a which carries a handle 27a. The support receptacle 35a has a rectangular lug 37a in place of a round shaft. The lug 37a is received in a mating square shaped opening 42 which is in the center of a sprocket gear 43, as seen in FIG. 7. The drive means for the rotisserie is carried on side frame 16a rather than frame 18, as previously illustrated in FIG. 1. Enclosed inside the frame member 16a is an endless chain 40a which can be driven by any variety of drive means. The individual sprocket members 43 for each skewer rod assembly are driven by chain 40a, as seen in FIG. 7. The opposite side of the skewer rod 24a is supported in grooves 23a of frame member 18a.

FIG. 11 is a further modified form of the support receptacle 35b formed of tubular stock with shaft 37b welded thereto.

OPERATION

Before removal or skewing of the food, support receptacle 35 must be removed from the ends of tines 30 and 31. The ends of the tines are pointed to better facilitate skewing the food. Once the food is placed on the tines, the support receptacle is replaced and the skewer rod assembly 24 is placed in the rotisserie rack, as seen in FIG. 1. The slots 22, in the frame member 20, act as a journal to the rotating shaft 37 of the receptacle 35. The opposite side of the skewer rod assembly is supported in slot 23 which acts as a journal to center rod portion 26 while sprocket gear 25 easily engages the moving chain 41. By merely moving the skewer rod handle upward, the sprocket gear 25 is disengaged from the drive chain 41. The support receptacle 35 which has a sliding fit on the ends of the tines is easily removed once the skewer rod assembly 24 is removed from the frame members, but while in place on the rotisserie frame, is held in place since axial movement of both the support receptacle and tines is restricted. The snug fit of the tines in openings 32 and 33 prevents the tines from any bending deflection approximate the ends thereof due to the weight of the food.

The modified form of skewer rod assembly 24a, seen in FIG. 6, is supported in a similar manner but is driven off of lug 37a on the support receptacle rather than a sprocket gear. When placing the skewer rod assembly in place on the rotisserie frame, the lug 37a must be aligned with its companion opening 42 before the drive means can be engaged. The skewer rod assembly 24a is also easily removed from the drive connection by moving the skewer rod axially away from the frame member 20a.

While the principles of the invention have been described in connection with specific apparatus and applications, it is to be understood that this description is made only by way of example and is not to be considered as a limitation on the scope of the invention.

I claim:

1. A barbecue rotisserie apparatus having a plurality of stations adapted to be mounted on the sides of a varying width cooking bed comprising:

a pair of longitudinal frame members having a plurality of longitudinally spaced slots for receipt and support of the individual skewers, the frame members adapted to be mounted on the side of said cooking bed;

a motor driven closed loop chain rotatably mounted on one of the frame members passing below each of said slots;

a plurality of multiple tine skewers, the tines having free ends, each skewer being removably positioned in one of said slots, gear means adjustably positioned longitudinally on each of the skewers in driving engagement with said chain and a removable support receptacle for each skewer having openings therein closed at one end for slidable receipt of the free ends of the skewer, the depth of the openings being sufficient to provide bending support for the tines and lug means for rotatably supporting the skewers.

2. A barbecue rotisserie apparatus as set forth in claim 1 wherein the skewers have a handle portion approximate one end thereof, the gear means being longitudinally positioned approximate the handle portion whereby the skewers may fit any width cooking bed.

* * * * *